Figure 1:
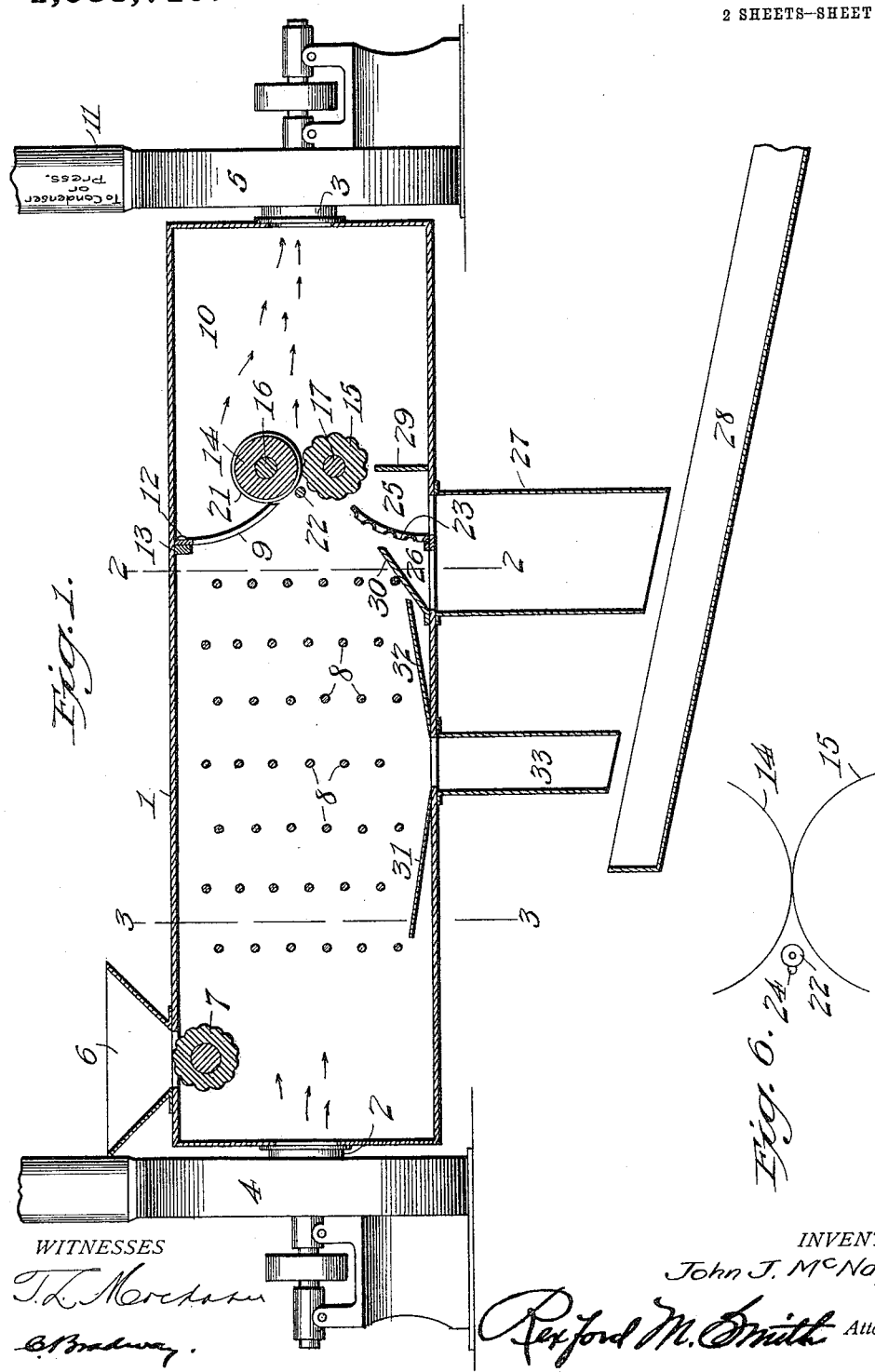

J. J. McNALLY.
SEED COTTON SEPARATOR.
APPLICATION FILED NOV. 9, 1911.
1,033,719.
Patented July 23, 1912.
2 SHEETS—SHEET 2.
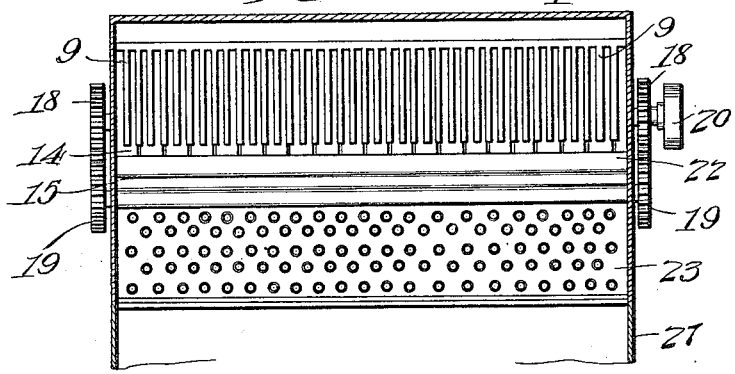
Fig. 2.
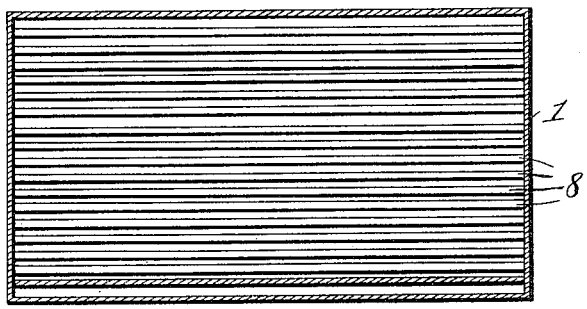
Fig. 3.
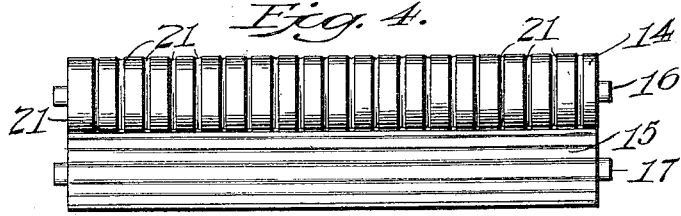
Fig. 4.
Fig. 5.
WITNESSES
INVENTOR
John J. McNally
Rexford M. Smith, Attorney
COLUMBIA PLANOGRAPH CO., WASHINGTON, D. C.

UNITED STATES PATENT OFFICE.

JOHN J. McNALLY, OF NORFOLK, VIRGINIA, ASSIGNOR TO McNALLY PNEUMATIC GIN CORPORATION, A CORPORATION OF VIRGINIA.

SEED-COTTON SEPARATOR.

1,033,719. Specification of Letters Patent. Patented July 23, 1912.

Continuation of application Serial No. 402,821, filed November 19, 1907. This application filed November 9, 1911. Serial No. 659,375.

*To all whom it may concern:*

Be it known that I, JOHN J. McNALLY, a citizen of the United States, residing at Norfolk, in the county of Norfolk and State of Virginia, have invented certain new and useful Improvements in Seed-Cotton Separators, of which the following is a specification, reference being had therein to the accompanying drawing.

This invention relates to seed cotton separators or apparatus for extracting or separating cotton, lint or delint from cotton seed, the invention hereinafter described being adapted also for use in connection with other like fibrous material necessary to be separated from the seed.

The invention has for its object the production of simple and efficient means of effecting a separation of the material above referred to by pneumatic and mechanical devices whereby a continuous and uninterrupted operation may be carried on.

With the above and other objects in view, the nature of which will more fully appear as the description proceeds, the invention consists in the novel construction, combination and arrangement herein fully described, illustrated and claimed.

In the accompanying drawings, Figure 1 is a vertical longitudinal section through the seed cotton separator of this invention. Fig. 2 is a vertical cross section through the same on the line 2—2 of Fig. 1. Fig. 3 is a similar section on the line 3—3 of Fig. 1. Fig. 4 is an elevation of the separator rolls. Fig. 5 is a detail cross section through a modified form of bar, used in connection with the separator rolls. Fig. 6 is a detail view showing one way of mounting such bar relatively to the casing and separator rolls.

The seed cotton separator contemplated in this invention comprises a box-like casing 1 closed at top and bottom and at both sides and also closed at both ends with the exception of an inlet nozzle 2 and an outlet nozzle 3 in connection with which I employ a blast fan 4 and a suction fan 5, the said fans being arranged at the opposite ends of the casing as shown in Fig. 1. If found sufficient, one fan may be used and the other omitted, the object being to obtain a good strong draft or blast of air through the interior of the casing in the direction of the length thereof, as indicated by the draft arrows. This casing 1 is preferably rectangular in cross section as indicated in the drawings but it will of course be understood that any desired form in cross section may be given thereto, and also that the casing may be made of any suitable length to get the desired action on the cotton passing lengthwise therethrough.

At or near the front of the casing is a feed hopper 6 which directs the cotton onto a feed roll 7 which works just within the casing under the hopper. This roll is preferably fluted or corrugated longitudinally so as to more effectively engage the seed cotton and force the same into the casing near the front end thereof where it is immediately taken up by the incoming blast of air and shot rearward and subjected to the action of a disintegrator consisting of a large number of cross bars or rods 8. These disintegrating bars 8 are preferably arranged in parallel relation to each other and may be either horizontal, as shown, or vertical, or at an angle to the vertical and horizontal; they are also by preference staggered as shown to obtain a greater disintegrating effect on the seed cotton. As the cotton is carried past the bars 8, the latter act to straighten out the fiber and pull a certain proportion of the fiber away from the seed. Such loose cotton fiber, after being straightened out in the manner described, is carried onward past the disintegrator and through an upper grate 9 into a finished cotton chamber 10 in rear of such grate and is delivered into a chute or conduit 11 leading to a condenser or press or other receptacle.

The grate 9 is preferably in the form of a comb, comprising a large number of teeth, as shown in Fig. 2, the teeth being connected to a backbone 12, in turn connected to and supported by a cross bar 13 extending across the top of the casing, as seen in Figs. 1 and 2. However, the teeth of the grate may be separate from each other and fastened in position in any convenient or desired manner. It is also preferred to incline the teeth of the grate 9 rearward from top to bottom, as indicated in Fig. 1 with the lower ends thereof lying close to or against the upper one of a pair of separator rolls 14 and 15, which work between the disintegrating chamber and the finished cotton chamber.

The separator rolls 14 and 15 may be composed of any material suitable to obtain a firm grip on the cotton fiber, but are preferably composed of rubber, and mounted on oppositely rotating shafts 16 and 17 which are geared together as shown at 18, 19, to turn in opposite directions, one of said shafts being provided with a belt pulley 20 by which motion is imparted to the separator rolls. These rolls operate close together so that the fiber caught between them will be carried back to the finished cotton chamber 10. In order to give to said rolls an effective grip on the fiber, their surfaces are preferably roughened. For example one of the rolls may be corrugated or fluted longitudinally while the other roll is corrugated or fluted transversely, as shown in Fig. 4 and indicated in Fig. 1. This will provide one of the rolls with annular grooves 21 that will cause a portion of the blast of air to pass between the rolls so as to suck the cotton between the same and enable the rolls to obtain their grip on such cotton.

Just in front of the meeting point of the separator rolls is arranged a bar 22 which obstructs the entrance to the contacting point of the rolls and holds back the seed, preventing the same from being caught by the rolls and carried through with the fiber. The seeds being thus held back and the fiber being drawn onward by the rolls, the fiber is pulled off the seeds and carried onward into the finished cotton chamber while the seeds fall downward upon an inclined lower grate 23. The bar 22 may either be movable or stationary. It may be made movable by mounting the ends thereof in slots 24 in the sides of the casing, as indicated in Fig. 6, thus allowing the bar to float toward and away from the rolls and adjust itself to suit conditions. Any suitable shape may be given to said bar 22, which, for example, is shown round in cross section in Fig. 1 and irregular in cross section in Fig. 5, in which last-named figure the shape of the bar corresponds more accurately to the space in front of the separator rolls. I do not, of course, wish to be limited to any special shape of seed bar.

The lower grate 23 preferably consists of a perforated plate of sheet metal, in which the holes are punched from the rear side to afford jagged edges around said holes at the front of the grate which will catch hold of the fiber remaining on the seed. In case sufficient fiber remains on the seed to prevent the same from passing through the perforations in the grate 23 they will again be caught up by the blast and carried upward and again subjected to the action of the separator rolls. When finally stripped of all fiber the seed will fall between the upper edge of the grate 23 and the lower roll 15 into a seed chamber 25, or fall into a similar chamber or pocket 26 in front of said grate, or pass through the perforations in the grate into the chamber or pocket 25. The chambers or pockets 25 and 26 lead into a chute 27 which in turn leads into a common conveyer trough 28 by which the seed are carried off to a suitable point.

Arranged under the disintegrator bars 8 are reversely slanting inclines 31 and 32 which direct any seed separated by the bars 8 into a chute 33 which discharges into the conveyer trough 28. The spaces between the teeth of the upper grate 9 are insufficient to allow the seed to pass between the teeth and likewise the perforations in the lower grate 23 are too small for the seed to pass through unless free of cotton; therefore the seed cannot get into the finished cotton chamber.

By means of the arrangement described above, in a single continuous operation all of the fiber is stripped from the seed leaving the seed in a perfectly clean condition similar to Sea Island or Egyptian cotton seed; nor is a tuft left at each end of the seed as is done with the ordinary delinting machines. The cotton is pulled from the seed by the roots and is not cut into as when operated on by the ordinary gin saws and again by the linter machines. In this way the value of the finished product is greatly enhanced.

Having thus described the invention, what I claim as new, is:—

1. A seed cotton separator comprising an air blast chamber, and separator rolls in the path of the blast moving in contact with one another, one of said rolls being fluted longitudinally and the other being channeled circumferentially.

2. A seed cotton separator comprising an air blast chamber, contacting separator rolls in the path of the blast operating to pull the cotton off the seed, and a stationary grate adjacent to said rolls which holds back the seed and permits the cotton to pass.

3. A seed cotton separator comprising an air blast chamber, separator rolls in the path of the blast operating to pull the cotton off the rolls, and a grate having an inclination toward the rolls which holds back the seed and permits the cotton to pass.

4. A seed cotton separator comprising an air blast chamber, separator rolls in the path of the blast operating to pull the cotton off the seed, and reversely inclined grates acting to direct the seed to the rolls and permit the cotton to pass.

5. A seed cotton separator comprising an air blast chamber, separator rolls in the path of the blast operating to pull the cotton off the seed, reversely inclined grates acting to direct the seed cotton to the rolls, and an imperforate stop wall behind one of said grates.

6. A seed cotton separator comprising an air blast chamber, separator rolls in the path of the blast operating to pull the cotton off the seed, reversely inclined grates acting to direct the seed cotton to the rolls, and a cant board located in front of one of the grates.

7. A seed cotton separator comprising an air blast chamber, separator rolls in the path of the blast operating to pull the cotton off the seed, and a cotton disintegrator located in advance of said rolls and consisting of parallel bars and the blast chamber walls, said bars being arranged in staggered relation to each other.

In testimony whereof I affix my signature in presence of two witnesses.

JOHN J. McNALLY.

Witnesses:
V. D. POINDEXTER,
T. H. SYNON.